United States Patent
Merle (10) Patent No.: US 7,607,376 B2
(45) Date of Patent: *Oct. 27, 2009

(54) PARING APPARATUS WITH PIVOTABLE PARING HEAD

(75) Inventor: Bernd Merle, Alsfeld (DE)

(73) Assignee: PF Schweisstechnologie GmbH (DE)

( * ) Notice: Subject to any disclaimer, the term of this patent is extended or adjusted under 35 U.S.C. 154(b) by 461 days.

This patent is subject to a terminal disclaimer.

(21) Appl. No.: 11/307,401

(22) Filed: Feb. 6, 2006

(65) Prior Publication Data

US 2007/0204731 A1    Sep. 6, 2007

Related U.S. Application Data

(63) Continuation of application No. 10/273,078, filed on Oct. 17, 2002, now Pat. No. 7,047,850.

(30) Foreign Application Priority Data

Oct. 26, 2001    (DE) ................. 101 52 910

(51) Int. Cl.
    *B23B 5/14*    (2006.01)
    *B23B 5/00*    (2006.01)
(52) U.S. Cl. ...................... 82/70.2; 414/22.61
(58) Field of Classification Search ................. 82/70.2, 82/162, 164, 903, 127, 170; 279/133; 414/22.61; 407/48, 40, 53, 103, 33, 34, 64
    See application file for complete search history.

(56) References Cited

U.S. PATENT DOCUMENTS 3,651,569 A * 3/1972 Arnot ................. 30/95
4,114,485 A * 9/1978 Coblitz et al. ................. 82/113
4,138,911 A * 2/1979 Namiguchi ................. 82/72
5,230,150 A * 7/1993 Sperti ................. 30/101
5,414,932 A * 5/1995 Azkona ................. 30/96
6,539,634 B2    4/2003 Merle et al.
7,047,850 B2    5/2006 Merle

FOREIGN PATENT DOCUMENTS

| DE | 35 29 527 A1 | 2/1987 |
| DE | 93 05 220.0 U1 | 12/1993 |
| DE | 295 16 513 U1 | 3/1997 |
| DE | 200 09 868 U1 | 9/2000 |
| DE | 201 09 153 U1 | 10/2001 |
| FR | 2 306 814 A1 | 11/1976 |
| FR | 2 570 007 A1 | 3/1986 |
| GB | 1 487 033 A | 9/1977 |

OTHER PUBLICATIONS

European Search Report for Application No. EP 02 02 2366, Nov. 25, 2004.

* cited by examiner

*Primary Examiner*—Willmon Fridie
(74) *Attorney, Agent, or Firm*—Hahn, Loeser & Parks, LLP; William S. Nabors (57) ABSTRACT

An apparatus for paring tubular articles (R), especially for plastic tubes, has at least one support unit (10) for supporting the article (R) to be pared, a paring unit (40) which has a paring head (44) with at least one blade assembly (46) and at least one guide assembly (48), and a carrier unit (70) to which the support unit (10) and the paring head unit (40) are held in mutually spaced relationship. The paring head (44) is pivotable about a pivot axis (50) which extends at least approximately perpendicularly to the plane defined by the support unit (10) and the paring unit (40).

18 Claims, 3 Drawing Sheets

PARING APPARATUS WITH PIVOTABLE PARING HEAD

This application is a continuation of U.S. non-provisional patent application Ser. No. 10/273,078, filed Oct. 17, 2002, which claims priority to German patent application number 101 52 910.4, filed Oct. 26, 2001, both of which are hereby incorporated by reference.

TECHNICAL FIELD

The invention relates to an apparatus for paring tubular articles, especially plastic tubes.

BACKGROUND OF THE ART

The surfaces of tubes, cables or cylindrical bars frequently require machining prior to further processing thereof. Thus for example in the case of cables it is necessary to remove an insulating layer while when welding plastic tubes the surface of the tubes has to be shaved off prior to the welding operation. In that situation a layer of the order of magnitude of between about 0.5 mm and 0.3 mm (and even deeper, in dependence on large tubes) is removed in the regions which are to be welded together. That procedure results in the removal of dirt inclusions from the manufacturing process and ageing-induced changes in the material, which can occur for example due to UV-damage or weathering at the surface and which would otherwise result in unsatisfactory welding results.

In order to be able to precisely remove a surface layer which is as thin as possible from the article to be machined, the cutting depth of the blade must be precisely adjusted. Such adjustment of the blade, which is necessary upon a change in the cutting depth and also upon a change in blade, requires skill and great experience on the part of the operator. If the blade is wrongly oriented, frequently an only inadequate machining quality is achieved. Then, either too much material is removed from the articles to be machined, whereby for example in the case of tubes the remaining cross-section is possibly unacceptably reduced, or the surface layers which are damaged due to dirt inclusions or ageing are not completely removed. If the blade is oriented in an inclined manner, it is then possible that unwanted grooves or channels are left behind on the article to be pared, and they can adversely affect the welding.

Tubular rolled coil material, due to the manner of manufacture involved, has a certain degree of ovality which also occurs in the case of tubular bar material due to prolonged storage times. That tube ovality is unwanted in the paring operation as, with a fixedly set spacing between the support unit and the paring unit, with the blade arranged thereon, the removal of material becomes irregular and untidy so that it is not possible to achieve satisfactory machining results. In extreme cases regions of the tube can remain unmachined while other regions of the tube are shaved off to an unacceptably great depth.

In order to remove the surface layer from tubes or the like, German utility model 93 05 220 U discloses a paring apparatus of the kind set forth in the opening part of this specification, in which the paring blade is fixedly connected to the paring head. In that paring apparatus the cutting depth of the paring blade must be accurately adjusted in order to be able to shave off exactly a surface layer which is as thin as possible, from the article to be machined. That adjustment procedure is necessary upon each change in the cutting depth and also when changing the blade, in order to ensure that incorrect orientation of the paring blade does not give rise to an only inadequate machining quality. As a consequence of the rigid connection of the paring blade to the paring head and thus to the guide element in the form of a roller, the paring blade, when dealing with deformed articles, in particular when there are raised portions and depressions on the article to be pared, can be lifted out of the material so that unpared locations remain on the article to be pared.

European patent application No 01 113 726 further discloses a paring apparatus which has been improved over the paring apparatus described in German utility model No 93 05 220, insofar as the blade assembly with the paring blade is adapted to be resilient and tiltable. In addition that arrangement has a spring element for compensating for ovality. Therefore a satisfactory paring result can be achieved with that known paring apparatus, when dealing with slightly deformed articles.

In the case of severely deformed tubes, however, unpared locations still remain behind even when using that paring apparatus. That is to be attributed to the fact that the necessary sliding shoes lift the sprung blade out of the material to be pared, at locations having raised portions or recesses.

The object of the present invention is to provide a paring apparatus of the kind set forth in the opening part of this specification, which, even in the case of severely deformed tubular articles, permits the outer skin of that article to be satisfactorily pared off, in particular without unpared locations.

SUMMARY OF THE INVENTION

This object is attained by the invention as claimed in the appended claims, including additional advantageous configurations of the invention.

The pivotability of the paring head with respect to the paring head unit makes it possible for the guide element or elements of the guide assembly to be oriented tangentially relative to the surface so that the paring blade can always penetrate into the material of the tubular article to be pared. In that way it is possible, even when dealing with severely deformed tubular articles, to carry out a paring operation on the article, at raised portions or recesses.

So that the paring head returns to its starting position, it is further advantageous if the paring head is biased elastically into a basic position, preferably by at least one spring element. The spring element used can be for example a coil spring.

In addition abutments can be provided, in particular on the paring unit, for limiting the pivotal movement of the paring head.

In order to achieve a pivotal radius which is as large as possible, it is further advantageous if the pivot axis is arranged in a direction parallel to the plane defined by the support unit and the paring head, in spaced relationship with the contact region of the guide assembly with the article to be pared, preferably on the paring unit. In this respect the term contact region is used to denote that contact point or that contact line or contact surface of the guide assembly, with which the guide assembly bears against the article to be pared.

In order to achieve precise guidance of the paring blade during the paring operation, it can further be provided that the guide assembly of the paring head has at least two guide elements which are arranged one behind the other in the paring direction, and that the pivot axis is arranged between the two guide elements, preferably centrally in relation thereto. In that case the two guide elements can be formed for example by rollers which are arranged one behind the other in a line, in relation to the paring direction.

Besides the above-outlined structure with two guide elements, there is also the possibility that the guide assembly of the paring head has two pairs of guide elements, the mounting points of which on the paring head define a rectangle, and that the pivot axis is arranged between the two pairs of guide elements, preferably centrally in relation thereto.

If the spacing between the guide elements, which are arranged in succession in the paring direction, of the guide assembly of the paring head is so set that it is as small as possible without the guide elements being impaired in terms of their operability, the paring result is not adversely influenced even by very small raised portions and recesses on the article to be pared as the guide elements and therewith the paring blade can follow those raised portions and recesses.

Different structures can be provided for the support unit. A very simple and thus inexpensive structure can be embodied for example if the support unit includes at least two slide elements which are spaced relative to each other along a circular arc and which are coated with a low-friction coating or lining. In order to be able to peel the tubular article without involving the application of a large amount of force, it can also be provided that the support unit has at least two and preferably four guide elements which are spaced relative to each other and which are arranged on a circular arc which is common to them.

As has already been mentioned above the guide elements can be formed for example by slide elements. Also for the purposes of promoting a paring operation which involves a low level of force, it is advantageous if the guide elements of the support unit and/or the paring unit are formed by freely rotatable guide rollers whose roller axes extend at least approximately parallel to the pivot axis.

So that the paring apparatus according to the invention can be used to pare tubular articles of different diameters, it can further be provided that the paring unit and/or the support unit are arranged displaceably along the carrier unit for adjusting the spacing between the paring unit and the support unit. So that displaceability is made possible, it can further be provided that the carrier unit has a spindle drive for adjusting the spacing between the paring unit and the support unit.

In this case the paring unit and/or the support unit may have a screwthread portion, by way of which it can be brought into releasable engagement with the spindle by way of a snap closure. That makes it possible to release the screwthread portion from the spindle for the purposes of coarse adjustment of the spacing between the support unit and the paring unit, and to adapt that spacing, without actuation of the spindle, to the diameter of the article to be machined. Fine adjustment of the spacing between the support unit and the paring unit can be effected by actuation of the spindle when the screwthread portion of the paring unit or the support unit engages into the spindle.

It can further be provided that the snap closure has a spring which acts on the snap closure in a first closed position in such a way that the screwthread portion of the paring unit or the support unit engages into the spindle, wherein the snap closure can be moved against the force of the spring into a second opened position in which the screwthread portion of the paring unit or the support unit is out of engagement with the spindle. The screwthread portion is urged against the spindle by the force of the spring so that the paring unit and the support unit are movable relative to each other only by actuation of the spindle. It is only by actuation of the snap closure against the spring force that it is possible to release the connection between the screwthread portion and the spindle in order to displace the paring unit or the support unit freely along the spindle guide. It is possible in that way to ensure that the screwthread portion does not disengage from the spindle during machining of an article by the paring unit, so that the spacing between the support unit and the paring unit would be lost in that way.

Preferably the snap closure has a lever which is pivotable about an axis and at the end of which, that is remote from the paring unit, is provided the screwthread portion which engages with the spindle, while provided at the end of the lever, which is towards the paring unit, are the spring which acts on the lever and a region which projects out of the paring unit or the support unit respectively and by which the lever is manually actuable against the spring force in order to move the snap closure into its opened position. Arranging the screwthread portion at the end of the lever, which is remote from the paring unit, makes it possible to ensure that the screwthread portion of the lever, in addition to the spring force acting thereon, is pressed against the spindle by the clamping engagement of the article to be pared, between the support unit and the paring unit. At the same time the snap closure is manually easily actuable by the region which projects out of the paring unit or the support unit respectively, so that it is easily possible to change between coarse adjustment and fine adjustment of the spacing between the support unit and the paring unit.

It is further provided in accordance with the invention that an elastic element is arranged in the spindle drive at least one end between the spindle and the spindle guide. The spindle is thereby held under a biasing effect in the spindle guide. That biasing effect is transmitted from the spindle by way of the screwthread portion to the paring unit or the support unit respectively. Deviations from roundness such as ovalities or the like in the article to be machined can be compensated by the paring apparatus in that way without the spacing between the support unit and the paring unit having to be re-adjusted during the machining operation. Handling of the paring apparatus is simplified thereby and at the same time the machining result can be considerably improved.

In a development of the invention it is provided that disposed at the end of the spindle, which is remote from the actuating handle, there is an indicator element which is connected to the spindle and which is movable at least in a region-wise manner into the spindle guide. If, when clamping an article to be machined in place between the support unit and the paring unit, the spindle is displaced against the force of the elastic element or elements in the spindle guide, then the indicator element which is connected to the spindle and which in the unloaded condition of the spindle projects out of the spindle guide is also moved. The spring constant of the elastic axial mounting of the spindle can in that respect be so selected that, at a defined biasing force in respect of the spindle, the indicator element is at a given position, that is to say for example terminates flush with the spindle guide. The biasing force in respect of the spindle can thus be read off by way of the position of the indicator element. A user can easily set an optimum spindle biasing situation by means of the indicator element in order thereby to achieve a good machining quality.

It is further provided that the guide assembly of the paring head has a mounting block on which the at least one guide element is preferably resiliently supported and which is freely pivotably secured preferably to the paring head about an axis which is perpendicular with respect to the pivot axis and which is arranged eccentrically with respect to the center of the mounting block. By virtue of the movement of the paring apparatus about the cylindrical article to be pared, the axis of the mounting block can be pivoted relative to the axis of the article to be pared, which extends at least approximately parallel to the pivot axis, so that the paring apparatus is moved in a helical movement about the cylindrical article. Upon a reversal in the direction of movement of the paring apparatus the freely rotatably mounted mounting block also pivots so that, upon an alternate movement of the paring apparatus about half the periphery of the cylindrical article, the paring apparatus is always further moved in the same axial direction. Thus with the paring apparatus according to the invention it is possible to pare even the region of a cylindrical article, which is required for boring clips or pipe outlets, without having to machine the complete periphery of the article. With the machining quality remaining the same therefore it is possible markedly to reduce the time for machining a cylindrical article if only the required regions are shaved off. As the pivot point of the mounting block is outside the center thereof, the entire mounting block, upon movement of the paring apparatus, pivots automatically into a position which provides for an axial advance movement of the paring apparatus towards the article to be pared.

It is further provided that the mounting block is fixed resiliently to the paring head. That makes it possible to achieve a constant contact pressure of the guide element against the article to be pared.

As an alternative thereto it is possible for the at least one guide element itself to be mounted resiliently in the mounting block. In that way it is also possible to achieve a constant contact pressure of the guide element against the article to be pared so that good machining quality is achieved by virtue of the high level of guidance accuracy.

In accordance with a preferred embodiment of the invention it is provided that the at least one guide element can be oriented and fixed in at least one angular position relative to the axis of the cylindrical article to be pared. The pitch of the screw movement with which the paring apparatus is moved around the article to be machined can thus be fixedly adjusted. An operator can ensure thereby that the cutting width of the paring blade is not exceeded by the pitch so that it is possible to achieve a high level of machining quality. The pitch can be adjusted by way of inclined positioning of the axes of the guide rollers, for differing diameters of the articles to be machined, so that an optimum cutting width can be achieved.

In a development of the invention, it is preferred that at least one fixing screw for fixing the mounting block relative to the blade assembly is provided on the mounting block. The fixing screw provides that the mounting block can be quickly and effectively oriented and fixed relative to the paring head. A change in the orientation of the mounting block relative to the paring head can also be effected speedily, for example if an article of a different diameter is to be machined, or if the blade width is varied. In this connection it is to be noted that the mounting block can obviously also be rigidly connected to the blade assembly from the outset.

In accordance with the invention it is provided that disposed on the paring head are two projections between which the mounting block is pivotable. It is possible in that way to avoid the mounting block being pivoted to an unacceptably great degree, whereby precise guidance of the paring apparatus on the article to be machined becomes impossible. Preferably the range in which the mounting block is pivotable is adjustable so that the paring apparatus can be adapted to different pitches.

In a further embodiment the blade assembly has a paring blade which has a knife member which is accommodated in a slide shoe and which is formed in one piece therewith, wherein the slide shoe is releasably fixed to the paring head. The slide shoe thereby bears against the article to be pared and thus permits good guidance for the knife member of the paring blade against the article to be pared. That makes it possible to achieve a particularly uniform depth of cut and thus a constant level of machining quality. In addition the integral configuration of the slide shoe with the knife member affords the advantage that the complicated operation of setting the blade in the adjusted position is eliminated. The knife member is already oriented at the correct angle relative to the slide shoe and connected thereto, upon production of the assembly, so that the slide shoe which carries the knife member then only has to be fixed to the paring head.

Preferably the slide shoe has two sliding surfaces which are spaced from each other by an opening. Those sliding surfaces bear against the article to be machined and guide the knife member of the paring blade. Tilting of the knife member of the paring blade can be avoided by the provision on the slide shoe of not just one sliding surface but two sliding surfaces which are spaced from each other. If those two sliding surfaces bear simultaneously against the article to be machined, a higher level of machining accuracy is achieved by the paring apparatus according to the invention.

In a development of the invention it is provided that the knife member of the paring blade is arranged in the opening in the slide shoe, wherein the knife member projects in a region-wise manner beyond the sliding surface of the slide shoe. The knife member of the paring blade is thus guided between the two sliding surfaces of the slide shoe. Tilting of the knife member on the article to be pared can be avoided in that way.

In accordance with a preferred embodiment of the invention the knife member is fixed with the sliding shoe to the paring head by way of a screw connection. The operation of changing the knife member with the slide shoe can be carried out quickly using simple means, as a result of that design configuration. Preferably only one single screw is required for fixing the knife member with the slide shoe to the paring head.

As an alternative thereto it can be provided that the knife member with the slide shoe is fixed to the paring head by way of a retaining or detent connection. That arrangement makes it possible for fitting or dismantling of the knife member with the slide shoe on the paring head to be made even easier as the knife member can be fixed to and released from the paring head by way of the retaining connection, without the aid of tools. Operation of the paring apparatus according to the invention is markedly facilitated in that way.

Preferably the knife member is a reversible knife member which is ground at two sides. The paring blade of the paring apparatus according to the invention thus has a replacement knife member available at the same time. The number of spare parts to be kept available for the paring apparatus can be reduced in that way. The manufacturing and operating costs of the paring apparatus thus remain low. The reversible knife member also makes it possible to provide that two different depths of cut can be achieved with a single knife member, if the two ground sides of the reversible knife member project by different distances beyond the sliding surfaces of the slide shoe.

In accordance with a further embodiment of the invention the slide shoe is fixed in a blade holder resiliently and/or tiltably on the paring head. Deviations from roundness such as ovalities or the like in the article to be machined can thus be compensated by the paring apparatus according to the invention, as well as inaccuracies in the axial direction, without the need to re-adjust the spacing between the support unit and the paring blade during the machining operation. In that way handling of the paring apparatus can be simplified and at the same time the machining result can be markedly increased. The biasing effect in respect of the blade also provides a uniform contact pressure which can ensure a constant machining quality, even when the paring apparatus is in operation over a prolonged period of time. The tiltability of the slide shoe also prevents inclined positioning or canting of the knife member so that grooves and the like are avoided.

In accordance with the invention it is provided that the blade holder is pivotable about a bolt or pin and is mounted in the paring head in a condition of being subjected to the action of at least two springs. The design configuration of the slide shoe with the knife member can be kept simple in that way as the resilient mounting for the slide shoe is disposed in the paring head in which there is sufficient structural space for that purpose. Replacement of the slide shoe can also be simplified in that way as it is not the entire resilient mounting arrangement that has to be replaced, but only the fixing of the slide shoe to the resiliently mounted blade holder has to be released. Handling of the paring apparatus according to the invention is markedly facilitated in that way.

Besides the pivotal movement about the pivot axis the paring head can also be adapted to be pivotable or tiltable about a further pivot axis or tilt axis. That further pivot or tilt axis extends substantially parallel to the plane defined by the support unit and the paring unit, that is to say that tilt axis extends tangentially relative to the article to be pared. This further pivotability or tiltability which can also be provided independently of the pivotability of the paring head about the pivot axis which extends perpendicularly to that of the paring unit and the support unit, is advantageous in particular when the article to be pared has a slight curvature along its longitudinal central axis.

In regard to the design configuration of the further pivot or tilt axis, it can further be provided that the pivot axis is mounted in the support arm in the form of a rocker member or that the further pivot or tilt axis together with the pivot axis form a universal joint. The support arm is then to be provided with corresponding bores, which affords that additional mobility. In addition there is the possibility of the further pivot or tilt axis being of a larger diameter relative to the first-mentioned pivot axis, in which case the latter passes through the tilt axis and the bore for the latter (=pivot axis) is of a diameter which is larger than the diameter of the pivot axis. Finally, an elastic element, for example of rubber, can be provided in place of the further pivot or tilt axis or both pivot axes.

Further advantageous configurations and an embodiment by way of example are described in greater detail hereinafter with reference the drawings. In this respect it is to be noted that the terms 'left', 'right', 'down' and 'up' used in connection with the specific description relate to the drawings with the reference numerals and identifications in the drawings being in a position such that they can be read normally.

BRIEF DESCRIPTION OF THE DRAWINGS

Better understanding of the invention will be had when reference is made to the accompanying figures, wherein identical parts are identified by identical reference numerals and wherein.

DETAILED DESCRIPTION OF THE INVENTION

The paring apparatus according to the invention has as essential structural and functional units a support unit 10, a paring unit 40 and a carrier unit 70. The support unit 10 and the paring unit 40 are held to the carrier unit 70 in such a way that the support unit 10 and the paring unit 40 are at a spacing relative to each other and define between them a plane in which, during use of the paring apparatus, the article R to be pared is arranged. In the illustrated embodiment the article R to be pared is a plastic tube.

For the purposes of adjusting the spacing between the support unit 10 and the paring unit 40 the carrier unit 70 is provided with a spindle drive which is described in greater detail hereinafter. In this case the spacing between the support unit 10 and the paring unit 40 is determined by the diameter of the tubular article R to be pared.

The support unit 10 firstly has a carrier arm 12 which is approximately in the shape of a circular arc. At the left-hand end of the carrier arm 12 the carrier arm 12 can be provided with an enlargement 14 on which are arranged suitable elements for engagement with the spindle drive of the carrier unit 70, as is described hereinafter with reference to FIG. 5.

Figures 1, 2:
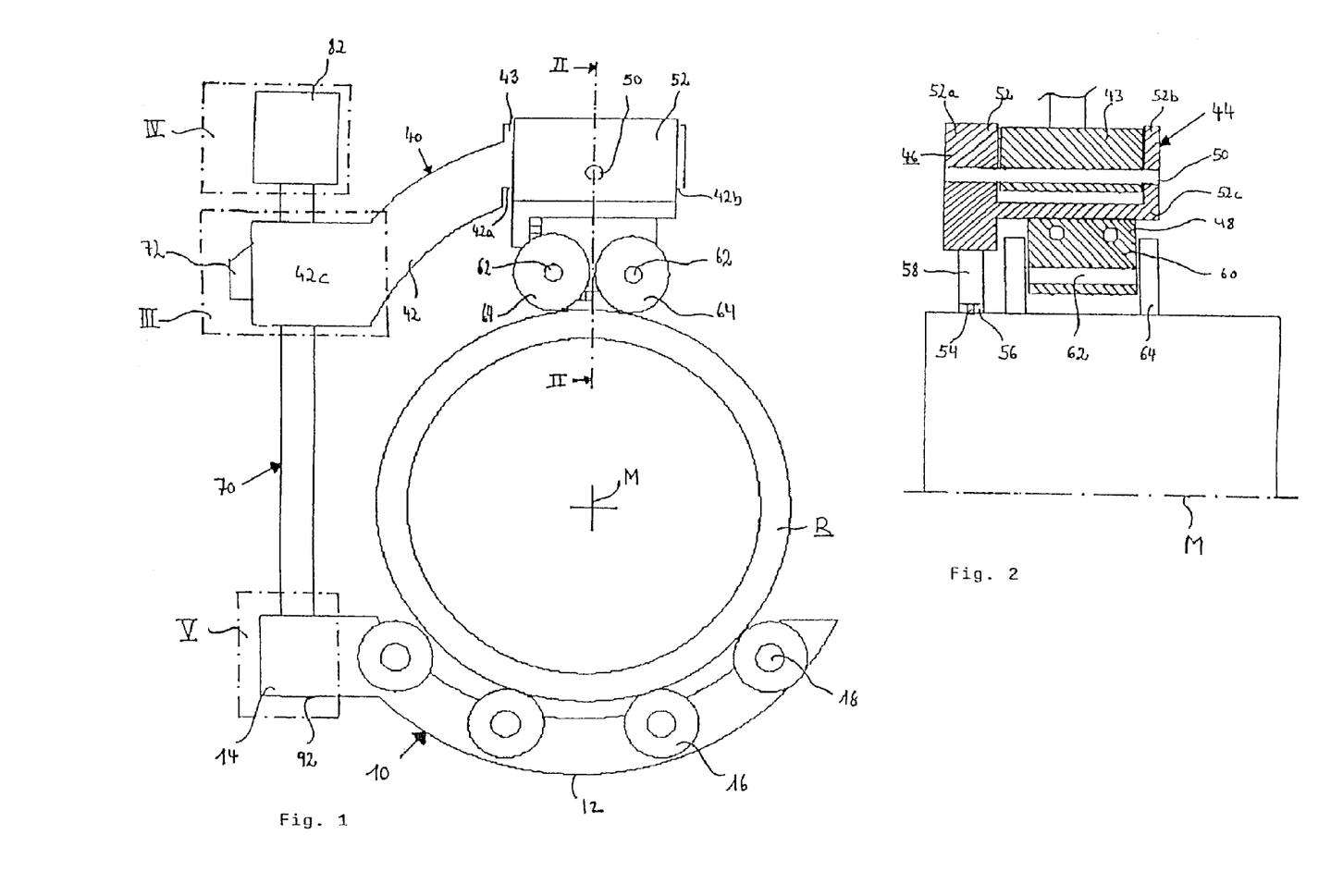
FIG. 1 shows a diagrammatic view from the front of the paring apparatus according to the invention.
FIG. 2 shows a partly sectional view along line II in FIG. 1.

A total of four pairs of guide rollers 16 are freely rotatably arranged on shafts 18 on the carrier arm 12. The shafts 18 extend perpendicularly to the plane defined between the support unit 10 and the paring unit 40 or parallel to the longitudinal central axis M of the tubular article R to be pared. As can be seen from FIG. 1 the shafts 18 are arranged equidistantly along the carrier arm 12 in such a way that the longitudinal central axes or center points of the shafts 18 lie on a common circular arc.

The paring unit 40 also includes a carrier arm 42 to which the paring unit 40 is held on the carrier unit 70 in a manner to be described in greater detail hereinafter. The carrier arm 42 is also approximately in the form of a circular arc, wherein provided at its free end which is remote from the carrier unit 70 there is an offset portion 43 of cuboidal cross-section, to which a paring head 44 of the paring unit 40 is pivotably mounted.

In addition the paring unit 40 has the paring head 44 which includes a blade assembly 46 and a guide assembly 48. The paring head 44 with the blade assembly 46 and the guide assembly 48 is held pivotably to the paring unit 40 by way of a pivot axis 50. In this arrangement the pivot axis 50 extends perpendicularly to the plane defined by the support unit 10 and the paring unit 40, that is to say, relative to FIG. 1, perpendicularly with respect to the sheet of drawing. In addition the pivot axis 50 is spaced from the contact region of the guide assembly 48 with the article R, in a direction perpendicular to the central longitudinal axis M of the article R to be pared.

The pivot axis shaft 50 is axially fixedly and non-rotatably fitted in the support arm 42 of the paring unit 40. Besides a continuous pivot shaft, it is also possible to provide on the carrier arm 42 two projections or trunnions about which the paring head 44 can pivot. To limit the pivotal movement, the carrier arm 42 is provided in the region of the paring head 44 with two abutment surfaces 42a, 42b.

Besides the pivotal movement about the pivot axis 50 the paring head 44 can also be designed to be pivotable or tiltable about a further pivot axis or tilt axis. That further pivot or tilt axis extends substantially parallel to the plane defined by the support unit 10 and the paring unit 40. In other words that tilt axis extends tangentially relative to the article R to be pared. That further pivot or tilt option is advantageous in particular if the article R to be pared has a slight curvature along its longitudinal central axis. In regard to the design configuration of the further pivot or tilt axis, it can further be provided that the pivot axis 50 in the carrier arm 42 is supported in the form of a rocker member or that the further pivot or tilt axis together with the pivot axis 50 form a universal joint. The carrier arm 42 is then to be provided with suitable bores, which affords that additional mobility.

The blade assembly 46 has a carrier 52 which is U-shaped in cross-section and which embraces the carrier arm 42 or the offset portion 43, in a U-shape. As can be seen from FIG. 2 the two vertically extending limbs of the U-shaped carrier 52 are not uniform in their thickness. The left-hand limb 52a is thicker than the right-hand limb 52b and carries the blade assembly 46.

The blade assembly 46 has a knife member 54 and a slide shoe 56 which is formed in one piece with the knife member 54. The knife member 54 with the slide shoe 56 can be mounted to the carrier 52 by way of a screw connection (not further shown). The slide shoe 54 has two mutually parallel, mutually spaced sliding surfaces. Formed between the sliding surfaces is an opening in which the knife member 54 is positioned. The tip of the knife member 54 projects beyond the sliding surfaces of the slide shoe 56. The height by which the knife member 54 projects beyond the slide shoe 56 is determined by the dimensions of the knife member 54. The integral design of the knife member 54 with the slide shoe 56 means that the predetermined spacing for paring the article R to be machined, by which the knife member 54 projects beyond the slide shoe 56, is already set upon manufacture.

It should also be noted in this connection that the knife member 54 can also be in the form of a reversible knife member. In that respect such a reversible knife member is ground at two opposite sides. The reversible knife member with the slide shoe 56 can be secured to the carrier 52 by way of a screw connection (also not shown). In that case the slide shoe 56 is also formed by two parallel, mutually spaced sliding surfaces which are in the form of sliding surfaces on both sides and between which there is also provided an opening in which the reversible knife member is accommodated. The reversible knife member with the slide shoe 56 can be removed from the carrier 52 by releasing the screw connection (not shown). For further machining the reversible knife member with the slide shoe 56 can then be secured to the carrier 52, in the turned condition. Different depths of cut can be set by virtue of the geometry of the knife member 54 or the reversible knife member.

The paring blade is mounted resiliently to the carrier 52. For that purpose there is a blade holder 58 which is mounted pivotably to the carrier 52 by means of a bolt or pin (not shown) and carries the slide shoe 56 with the knife member 54. The blade holder 58 is also subjected to the action of two springs (also not shown). When the slide shoe 56 of the knife member 54 is loaded during machining of an article R to be pared, the blade holder 58 is deflected in a tilting or pivotal movement about the pin or bolt, against the force of the springs.

The guide assembly 48 is held on the horizontally extending limb 52c of the carrier 52. The guide assembly 58 is of a parallelepipedic cross-section and held rotatably to the horizontal limb 52c of the U-shaped carrier 52 by way of a rotary pin or bolt (also not shown) which is arranged eccentrically relative to the center of the base surface of the parallelepiped.

The guide assembly 48 has a mounting block 60 on which two rotary shafts 62 are held axially fixedly and non-rotatably. The rotary shafts 62 extend in mutually spaced relationship and perpendicularly to the plane defined between the support unit 10 and the paring unit 40. The rotary shafts 62 project beyond the parallelepipedic mounting block 60 so that four guide rollers 64 can be mounted at the ends of the rotary shafts 62 in axially fixed but rotatable relationship, in such a way that they define a rectangle and the mounting block 60 forms a carriage. As can be seen from FIG. 1, in this case the spacing of the two rotary shafts 62 is so selected that the guide rollers 64 are at such a spacing relative to each other that they are arranged as close to each other as possible, but can still rotate freely. As can further be seen from FIG. 1 the pivot shaft 50 is arranged centrally between the two rotary shafts 62.

As has already been set forth hereinbefore, the mounting block 60 is held by way of a rotary trunnion or projection (not shown) which extends substantially parallel to the longitudinal central axis M of the article R to be pared or perpendicularly to the pivot axis 50. Pivotability of the mounting block 60 with respect to the U-shaped carrier 52 is limited by two abutments (also not shown).

When the paring apparatus according to the invention is used the guide rollers 16 and 64 respectively bear against an article R to be machined and are moved around the periphery of the article R to be pared. The mounting block or carriage 60 is pivoted in dependence on the direction of movement of the paring apparatus. Due to the eccentric mounting of the mounting block 60, it is pivoted by virtue of the rotary movement about the article R to be machined until it bears against the above-mentioned projections. In that way the shafts 62 of the guide rollers 64 are oriented inclinedly relative to the article R to be paired so that the paring apparatus is moved in a screw motion about the article R to be pared.

When only a section, and not the entire periphery, of an article R is to be pared, that is implemented by a change in the direction of movement of the paring apparatus around the article R to be machined. The change in the direction of movement also causes pivotal movement of the mounting block 60 with the guide rollers 64 so that in spite of the change in the peripheral movement of the paring apparatus an axial movement of the paring apparatus can be implemented.

Figure 3:
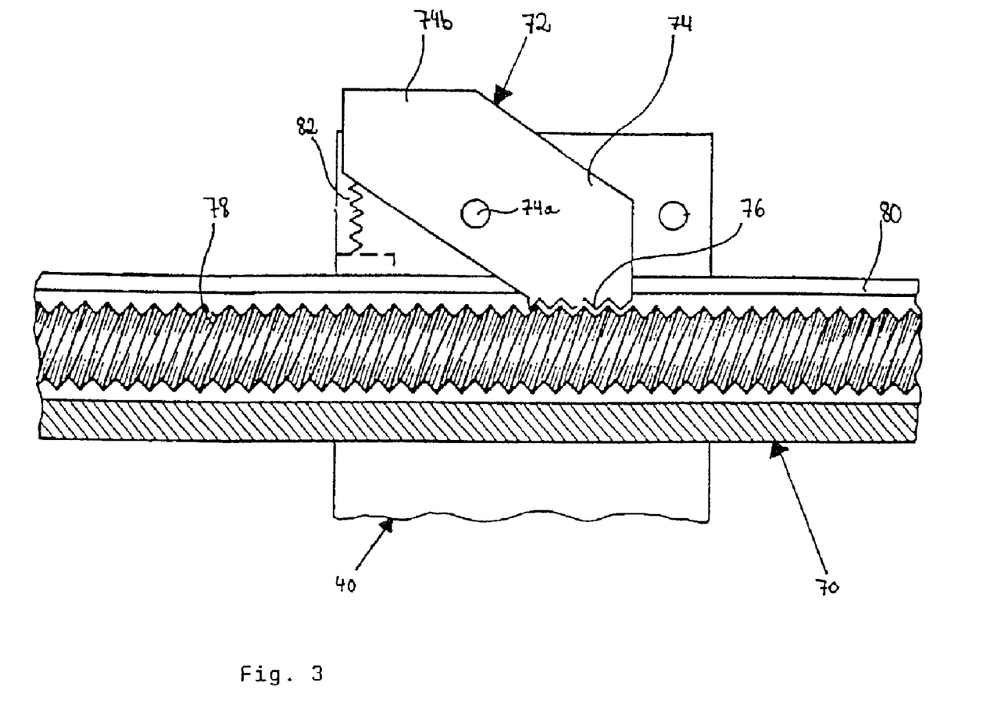
FIG. 3 is a partly broken-away view on an enlarged scale of the region III in FIG. 1.

The paring unit 40 can be designed with a snap closure 72 which is shown in FIG. 3 and which, at the end of the carrier arm 42 opposite to the paring head 44, is arranged in an enlargement 42c of the carrier arm 42. The snap closure 72 includes a lever 74 which is mounted in the paring unit 40 pivotably about an axis 74a. Formed at one end of the lever 74 is a screwthread portion 76 which can be brought into engagement with a spindle 78 of the spindle drive. In this arrangement the lever 74 extends with its end carrying the screwthread portion 76, through the slot-shaped opening 80 of the carrier unit 70 into the spindle drive. In this case the opening is of a width which corresponds at least to the width of the screwthread portion 76, that is to say for example the diameter of the spindle 78. The other lever arm of the lever 74 is subjected to the force of a spring 82 connected to the paring unit 40, in such a way that the screwthread portion 76 is pressed against the spindle 78.

Also provided on the lever 74 is a region 74b which projects out of the paring unit 40. When pressure is manually applied to that region of the lever 74, the lever 74 pivots against the force of the spring 82 in the counter-clockwise direction in FIG. 3. Thus the screwthread portion 76 comes out of engagement with the spindle 78 so that the paring unit 40 rests exclusively on the spindle guide which is formed by the outside of the carrier unit 70 on both sides of the slot or the slot-shaped opening 80. The paring unit 40 can thus be freely displaced on the spindle guide. The movement of the lever 74 upon actuation of the region of the snap closure 72 is limited by an abutment.

Figure 4:
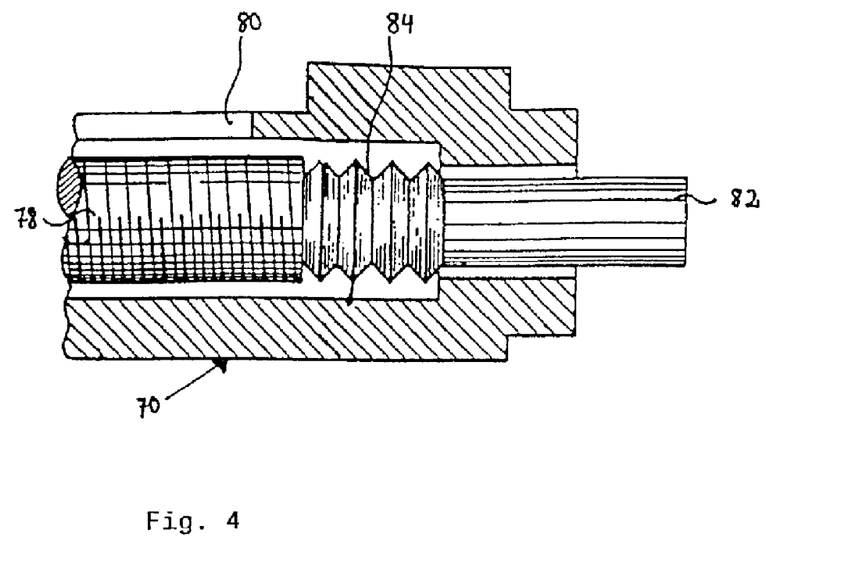
FIG. 4 is a partly broken-away view on an enlarged scale of the region IV in FIG. 1.
Figure 5:
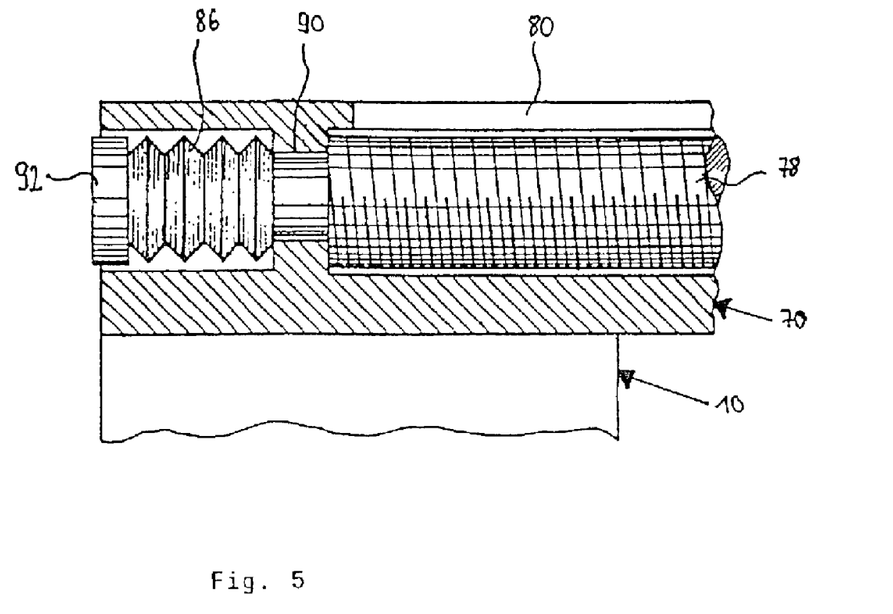
FIG. 5 is a partly broken-away view on an enlarged scale of the region V in FIG. 1.

The spindle 78 is mounted freely rotatably in the spindle guide at the end of the support unit 10. As can be seen from FIG. 4 the spindle 78 is also freely rotatably mounted in the spindle guide, at the end remote from the support unit 10. Outside the spindle guide the spindle 78, at its end remote from the support unit 10, opens into an actuating handle 82, by way of which the spindle 78 is manually rotatable. Provided on the side of the spindle guide, which is the upper side in FIGS. 4 and 5, is the slot-shaped opening 80 which extends substantially over the entire length of the spindle drive.

Provided at the side of the actuating handle 82, in a mounting for the spindle in the spindle guide, in a step in the spindle 78, is a plate spring pack 84 comprising a plurality of plate springs. A plate spring pack 86 is also provided between the spindle guide and the spindle 78, at the end of the spindle drive which is opposite to the actuating handle 82, as is shown in FIG. 5. In this case the plate spring pack 86 bears against a mounting 90 of the spindle guide and an indicator element 82 which is fixed to the spindle 78 and which projects out of the spindle guide in the unloaded condition of the plate spring packs 84, 86.

The spindle 78 can thus be displaced within the spindle guide towards the mounting 90 (towards the right in the Figures) against the force of the plate spring packs 84, 86. In that way the indicator element 92 which is connected to the spindle 78 is also moved completely into the spindle guide. With a predetermined force acting on the spindle 78 and the plate spring pack 84, 86, the indicator element 92 is displaced precisely to such an extent that its remote side is aligned with the outer edge of the spindle guide. Thus, by way of the position of the indicator element 92, a user can be afforded a display of the defined force with which the spindle 78 is pressed against the spindle guide.

What is claimed is:

1. An apparatus for paring tubular articles, comprising:
   at least one support unit for supporting the article to be pared;
   a paring unit comprising a paring head with at least one blade assembly and at least one guide assembly;
   a carrier unit for holding the support unit and the paring unit in a spaced apart relationship;
   wherein the paring head pivots about a pivot axis which extends approximately perpendicularly to a plane defined by the support unit and the paring unit;
   wherein the blade assembly comprises a knife member having at least one cutting edge formed generally parallel to the pivot axis of the paring head; and
   wherein the at least one guide assembly comprises at least two guide elements arranged successively in a direction in which paring occurs and the pivot axis is positioned between the guide elements.

2. The apparatus of claim 1, wherein each of the at least two guide elements comprises a pair of guide rollers, each guide roller mounted to the guide assembly at a mounting point such that the mounting points define a rectangle, and the pivot axis is positioned between the two pairs of guide rollers.

3. The apparatus of claim 1, wherein at least one of the paring unit and the support unit comprises a snap closure having a screw thread portion for releasably engaging a spindle of a spindle drive for adjusting the spacing between the paring unit and the support unit.

4. The apparatus of claim 1, further comprising a biaser that holds the paring head elastically in a first position.

5. The apparatus of claim 2, further comprising at least two abutments for limiting the pivoting of the paring head.

6. The apparatus of claim 2, wherein the knife member is formed in one piece with a slide shoe, the slide shoe being releasably fixed to the paring head.

7. The apparatus of claim 6, wherein the slide shoe has two sliding surfaces which are spaced apart from each other by an opening.

8. The apparatus of claim 7, wherein the knife member is positioned in the opening in the slide shoe and a portion thereof projects beyond the sliding surfaces.

9. The apparatus of claim 1, wherein the knife member is positioned to shave a portion of an outer surface of the tubular article at a predetermined depth and width.

10. An apparatus for paring tubular articles, comprising:
    at least one support unit for supporting the article to be pared;
    a paring unit comprising a paring head with at least one blade assembly and at least one guide assembly;
    a carrier unit for holding the support unit and the paring unit in a spaced apart relationship;
    wherein the paring head pivots about a pivot axis which is provided at the paring unit and which extends approximately perpendicularly to a plane defined by the support unit and the paring unit;
    wherein the blade assembly comprises a knife member positioned to shave an outer surface of the tubular article at a predetermined depth and width; and
    wherein the at least one guide assembly comprises at least two guide elements arranged successively in a direction in which paring occurs and the pivot axis is positioned between the guide elements.

11. The apparatus of claim 10, wherein the blade assembly comprises a knife member having at least one cutting edge formed generally parallel to the pivot axis of the paring head.

12. The apparatus of claim 10, wherein each of the at least two guide elements comprises a pair of guide rollers, each guide roller mounted to the guide assembly at a mounting point such that the mounting points define a rectangle, and the pivot axis is positioned between the two pairs of guide rollers.

13. The apparatus of claim 10, wherein at least one of the paring unit and the support unit comprises a snap closure having a screw thread portion for releasably engaging a spindle of a spindle drive for adjusting the spacing between the paring unit and the support unit.

14. An apparatus for paring tubular articles, comprising:
    at least one support unit for supporting the article to be pared;
    a paring unit comprising a paring head with at least one blade assembly and at least one guide assembly;
    a carrier unit for holding the support unit and the paring unit in a spaced apart relationship; and
    wherein the paring head pivots about a pivot axis which is provided at the paring unit and which extends approximately perpendicularly to a plane defined by the support unit and the paring unit; and
    the at least one guide assembly comprises at least two guide elements arranged successively in a direction in which paring occurs and the pivot axis is positioned between the guide elements.

15. The apparatus of claim 14, wherein the blade assembly comprises a knife member having at least one cutting edge formed generally parallel to the pivot axis of the paring head.

16. The apparatus of claim 14, wherein the blade assembly comprises a knife member positioned to shave an outer surface of the tubular article at a predetermined depth and width.

17. The apparatus of claim 14, wherein at least one of the paring unit and the support unit comprises a snap closure having a screw thread portion for releasably engaging a spindle of a spindle drive for adjusting the spacing between the paring unit and the support unit.

18. The apparatus of claim 14, wherein the at least one guide element is resiliently mounted to the mounting block, wherein the mounting block is fixed resiliently to the paring head and pivots freely about an axis that is perpendicular to the pivot axis.

* * * * *

UNITED STATES PATENT AND TRADEMARK OFFICE
CERTIFICATE OF CORRECTION

PATENT NO. : 7,607,376 B2
APPLICATION NO. : 11/307401
DATED : October 27, 2009
INVENTOR(S) : Bernd Merle It is certified that error appears in the above-identified patent and that said Letters Patent is hereby corrected as shown below:

Column 11, line 66 and column 12, line 1, for the claim reference numeral "2", each occurrence, should read --1--.

Signed and Sealed this

Nineteenth Day of January, 2010

David J. Kappos
*Director of the United States Patent and Trademark Office*